United States Patent [19]
Van Zutphen

[11] 3,791,156
[45] Feb. 12, 1974

[54] METHOD AND APPARATUS FOR DETERMINING THE POSITION OF A PIPELINE OR THE LIKE DURING THE ENTRENCHING THEREOF

[75] Inventor: Antonie C. Van Zutphen, Bergschenhoek, Netherlands

[73] Assignee: N.V. Industrieele Handelscombinatie Holland, Rotterdam, Netherlands

[22] Filed: Sept. 13, 1971

[21] Appl. No.: 179,793

[30] Foreign Application Priority Data
Sept. 14, 1970 Netherlands............... 7013562

[52] U.S. Cl............................. 61/72.4, 33/84, 72/32
[51] Int. Cl........................... E02f 5/02, B21c 51/00
[58] Field of Search ....... 61/72.4, 72.3, 72.1; 33/84, 33/206; 72/32, 35

[56] References Cited
UNITED STATES PATENTS
| | | | |
|---|---|---|---|
| 3,396,565 | 8/1968 | Miller | 72/32 X |
| 3,505,826 | 4/1970 | Harmstorf | 61/72.4 |
| 3,472,035 | 10/1969 | Broussard et al. | 61/72.3 |
| 2,953,048 | 9/1960 | Brown | 72/35 |

Primary Examiner—Jacob Shapiro
Attorney, Agent, or Firm—Young & Thompson

[57] ABSTRACT

Pipelines are entrenched on a marine floor by dragging therealong a plurality of spray nozzles that dig a trench for the pipeline. Undesirably sharp local curvature of the pipeline is avoided by providing each spray device with a clinometer the clinometer readings being transmitted to a point above the surface of the water and the composite of these received clinometer readings permitting control of the trenching process so as to avoid that undesirable curvature.

4 Claims, 1 Drawing Figure

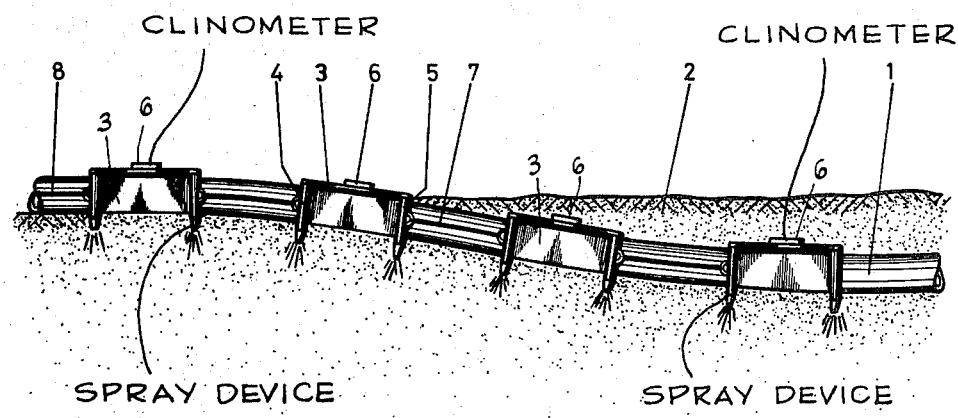

METHOD AND APPARATUS FOR DETERMINING THE POSITION OF A PIPELINE OR THE LIKE DURING THE ENTRENCHING THEREOF

Pipelines which have to be laid on a marine floor or the like generally have to be entrenched in order to protect the pipeline. In view of the danger of hydrostatic lift and in order to protect the metal of said pipeline, these pipelines are usually encased in concrete. In laying the pipeline great care has to be taken that the local angle of curvature of the pipeline does not become too great, because in that case the concrete covering is very likely to crack, while the metal pipe itself can be damaged as well. When lowering the pipeline to the marine bottom, it is not possible in general to observe the exact procedure, because the water is not clear enough to do so and, if the pipeline has to be entrenched this is not possible at all.

It is the object of the invention to provide a solution to this problem and this object is primarily achieved by the fact that the pipeline is provided with clinometers at regularly spaced distances, which clinometers send their measurements to a central receiving zone. Due to the fact that there are now used a series of clinometers, the invisible bends of the pipeline can be deduced from the data obtained from the clinometers, because the mutual distance of the clinometers is known and the slope per meter is read from the data received. This method can be used both when the pipeline is laid on the marine floor and when the pipeline is entrenched.

There are several devices known in the art for the entrenching of the pipeline. If the marine floor consists of sand, entrenching can be carried out with the aid of spray nozzles. It is now possible in accordance with the present invention to control the spray nozzles in dependency on the angle of the pipeline measured by the clinometers. This makes it possible to control their course. If it is noticed that the pipeline is showing a too great curvature, is either too deep or not deep enough under the sand, the spray nozzles can be adjusted as desired.

The apparatus for carrying out the method according to the invention preferably comprises a number of spraying devices, arranged across the pipeline in a straddling manner, which are coupled together and provided with clinometers. Such a train of spraying devices can be moved over the pipeline synchronously with the entrenching of the pipeline, so that synchronously with the entrenching process the form of the pipeline can be controlled as well. It is possible to automate the entire entrenching process, the speed of the train of spraying devices with clinometers depending on the permissible slope and the depth at which the pipeline is sunk into the soil.

According to the invention the spraying devices may consist of uniformly spaced spray nozzles provided with the clinometer.

The invention will now be explained in more detail with reference to the drawing. The drawing shows the entrenching of a pipeline 1 into the bottom 2. On the pipeline are arranged four spraying devices 3 in such a way that they straddle said pipeline, each of the spraying devices being provided with spray nozzles 4 and 5 respectively. On the top of the framework interconnecting the spray nozzles 4 and 5 there is the clinometer 6. The devices are connected with one another by means of resilient connecting elements 7. With the aid of a pulling member 8, which is connected to means not shown, the train of devices 3 can be moved along the pipeline. The spray nozzles 4 and 5 are connected with water pipes not shown, which extend from a vessel floating on the water with pumping setting and control means, for instance, which vessel can also receive the measurements of the clinometers 6 through cables not shown. From the data provided by the clinometers, the local slope of the pipeline and thus the radius of curvature can be controlled and, if the pipeline has to be entrenched with the aid of spray nozzles, adjustments can be made by controlling the spray nozzles, if desired. The entire apparatus is preferably adapted to be moved in the length of the pipeline.

However, it is also conceivable, the more so when the pipeline has to be laid on the bottom and need not be entrenched, to arrange the clinometers inside the pipeline.

I claim:

1. A method for determining the position of a pipeline or the like during the laying and/or entrenching of a pipeline, comprising disposing a series of regularly spaced clinometers along the length of a pipeline, transmitting signals from said clinometers to a centrally disposed receiving zone thereby to provide data characteristic of the shape of the pipeline along said series of clinometers, entrenching the pipeline by means of spray devices spaced along the pipeline, moving said spray devices along the pipeline, and controlling the movement of said spray devices in dependency on said signals.

2. A method as claimed in claim 1, and moving said clinometers along the pipeline at the same speed as said spray devices.

3. Apparatus for determining the position of a pipeline or the like during the laying and/or entrenching of said pipeline, comprising a plurality of clinometers, means supporting said clinometers adjacent the pipeline in equally spaced relation in a series along said pipeline, means for moving said series of clinometers lengthwise along the pipeline while maintaining said equally spaced relation, and spray devices for entrenching said pipeline, said spray devices being spaced along said pipeline and articulately interconnected, said clinometers being connected to said spray devices for movement with said spray devices along said pipeline.

4. Apparatus as claimed in claim 3, each said spray device comprising a framework having a plurality of spray nozzles thereon spaced apart lengthwise of the pipeline, and a said clinometer carried by said framework.

* * * * *